(12) United States Patent
Genc et al.

(10) Patent No.: US 10,824,913 B1
(45) Date of Patent: Nov. 3, 2020

(54) TRAINING MACHINE LEARNING MODELS FOR PHYSICAL AGENTS AND ROBOTIC CONTROLS WITH SIMULATIONS

(71) Applicant: Amazon Technologies, Inc., Seattle, WA (US)

(72) Inventors: Sahika Genc, Mercer Island, WA (US); Edo Liberty, New York, NY (US)

(73) Assignee: Amazon Technologies, LLC, Seattle, WA (US)

( * ) Notice: Subject to any disclaimer, the term of this patent is extended or adjusted under 35 U.S.C. 154(b) by 161 days.

(21) Appl. No.: 16/198,313

(22) Filed: Nov. 21, 2018

(51) Int. Cl.
| G06K 9/00 | (2006.01) |
| G06K 9/62 | (2006.01) |
| G05D 1/00 | (2006.01) |
| G05D 1/02 | (2020.01) |

(52) U.S. Cl.
CPC ......... *G06K 9/6262* (2013.01); *G05D 1/0038* (2013.01); *G05D 1/0221* (2013.01); *G05D 1/0231* (2013.01); *G06K 9/6256* (2013.01)

(58) Field of Classification Search
None
See application file for complete search history.

(56) References Cited

U.S. PATENT DOCUMENTS

| 10,564,638 | B1* | 2/2020 | Lockwood | G06N 7/00 |
| 10,678,253 | B2* | 6/2020 | Zeng | G01C 21/20 |
| 2019/0026923 | A1* | 1/2019 | Shinya | G06K 9/00825 |
| 2019/0212749 | A1* | 7/2019 | Chen | B62D 15/0255 |
| 2019/0250622 | A1* | 8/2019 | Nister | G06K 9/00825 |
| 2019/0286921 | A1* | 9/2019 | Liang | G06T 7/70 |
| 2019/0303759 | A1* | 10/2019 | Farabet | G06K 9/00791 |
| 2019/0384303 | A1* | 12/2019 | Muller | G06N 20/00 |
| 2019/0384304 | A1* | 12/2019 | Towal | G05D 1/0221 |
| 2020/0065711 | A1* | 2/2020 | Clement | G07C 5/085 |
| 2020/0082248 | A1* | 3/2020 | Villegas | G05D 1/0223 |
| 2020/0089232 | A1* | 3/2020 | Gdalyahu | G01C 21/3602 |
| 2020/0097754 | A1* | 3/2020 | Tawari | G06K 9/6256 |
| 2020/0122588 | A1* | 4/2020 | Cserna | B60L 15/2045 |
| 2020/0159225 | A1* | 5/2020 | Zeng | G05D 1/0088 |
| 2020/0160559 | A1* | 5/2020 | Urtasun | G06T 7/55 |

OTHER PUBLICATIONS

LeCun et al. "Off-Road Obstacle Avoidance through End-to-End Learning", Advances in Neural Information Processing Systems 18 [Neural Information Processing Systems, NIPS 2005, Dec. 5-8, 2005 (Year: 2005).*

(Continued)

*Primary Examiner* — Randolph I Chu
(74) *Attorney, Agent, or Firm* — Nicholson De Vos Webster & Elliott, LLP

(57) ABSTRACT

Techniques for performing image-augmentation based simulations on are described. An exemplary embodiment of such performances includes for each tuple of timestamped image and movement data, generating a next image using an image generation neural network based on the timestamped image and movement data, the image being input into the image generation neural network as a non-rendered image, and generating a reward using a reward generating neural network based on the timestamped image and movement data.

20 Claims, 12 Drawing Sheets

(56) References Cited

OTHER PUBLICATIONS

Pomerleau, "ALVINN: An Autonomous Land Vehicle in a Neural Network", Advances in neural information processing systems Dec. 1, 1989 pp. 305-313 (Year: 1989).*
Bojarski et al. "End to End Learning for Self-Driving Cars", arXiv:1604.07316v1 [cs.CV] Apr. 25, 2016 (Year: 2016).*
Rohit Ramanna et al., "Simulation: A Must for Autonomous Driving", NVIDIA GTC 2018 (Silicon Valley) / Talk ID: S8859 (Year: 2018).*

* cited by examiner

TRAINING MACHINE LEARNING MODELS FOR PHYSICAL AGENTS AND ROBOTIC CONTROLS WITH SIMULATIONS

BACKGROUND

In some instances, control systems and agents (such as robots, self-driving cars, etc.) utilize machine learning models to dictate actions take such as how fast to move, what direction to move, etc. Depending upon the implementation, these control systems and agents are controlled using a central system or are self-sufficient.

BRIEF DESCRIPTION OF DRAWINGS

Various embodiments in accordance with the present disclosure will be described with reference to the drawings, in which:

FIG. 2 illustrates an example of physical environment for a (remote) agent and subsequent ML model using device to interact with.

FIG. 3 illustrates another view of the exemplary of physical environment for a (remote) agent and subsequent ML model using device to interact with.

FIG. 4 illustrates another view of the exemplary of physical environment for a (remote) agent and subsequent ML model using device to interact with.

DETAILED DESCRIPTION

Various embodiments of methods, apparatus, systems, and non-transitory computer-readable storage media for training a machine learning model using data from an image-augmentation based simulation are described.

A way to train a machine learning model used by control systems and agents is to physically perform a variety of scenarios that the system or agent may encounter and use that data to train the model. This type of training is expensive and slow. Another approach is to a simulation that renders the environment the control system or agent will operate in. An obstacle in this approach is that the simulator needs to be very accurate for the learning in the simulator to translate to real life. Unfortunately, this may result in a massive investment in more accurate simulations.

Detailed herein are embodiments detailing training of a machine learning model from training data generated from sensory data (such as image, speed, and orientation data) captured in real life and processed by an image-augmentation based simulation environment. This image-augmentation based simulation environment does not render an environment, but instead uses captured images as a basis for generating training data. This reduces compute and other costs of training.

Examples of where such trained machine learning models may be used include, but are not limited to: fine robotic control (e.g., use images of parts and various orientations of the parts and a robotic component contact the parts), warehouse robots (e.g., use images of the warehouse and action data (vectors of speed and direction) to train a machine learning model for navigating the warehouse), self-driving vehicles (e.g., use images of the warehouse and action data (vectors of speed and direction/orientation) to train a machine learning model for navigating the warehouse), etc.

Figure 1:
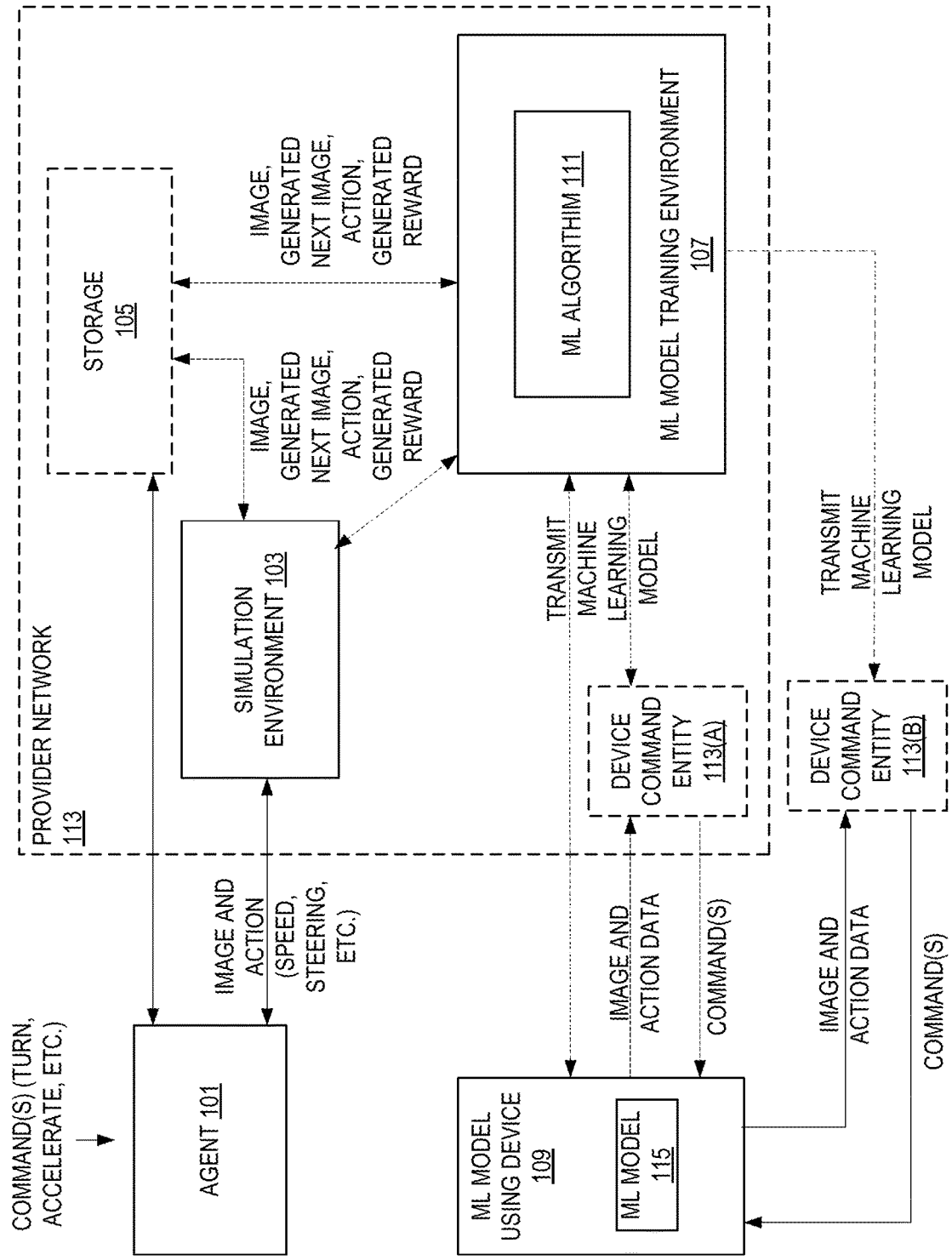
FIG. 1 illustrates embodiments of a system for training a machine learning model using data generated by a simulation environment.

FIG. 1 illustrates embodiments of a system for training a machine learning model using data generated by a simulation environment. As illustrated, a (remote) agent 101 is provided commands to interact with a physical environment. The (remote) agent 101 includes one or more sensors including at least one camera to capture images as it interacts with the physical environment according to the provided commands Additional sensors may include one or more accelerometers that provide direction and speed for the (remote) agent 101. For example, in some embodiments, the (remote) agent 101 is a remote vehicle (such as a wheeled vehicle, drone, etc.) that is provided commands (such as radio frequency commands) to maneuver in a physical environment. Other (remote) agents 101 may include robotic limbs, etc.

Depending upon the implementation, a command may include one or more of an intended vector (such as an intended speed and direction of movement), a request to capture an image, a request to capture the actual vector (such as an actual speed and direction of movement), a location to store captured data (such as the image, etc.), etc. In some instances, the vector data is referred to as "action" data in this specification. The sensor data is associated with a timestamp. As such, each captured image and vector data is associated with a particular moment in time.

In some embodiments, commands are manual provided to the (remote) agent 101 such as through a command interface. In other embodiments, commands are programmed and provided to the (remote) agent 101.

The (remote) agent 101 provides the sensor data (such as the images and action data) to a simulation environment 103 as a tuple of data including associated timestamps. This sensor data may be remotely transmitted (over-the-air) and/or provided via a storage medium. In some embodiments, the (remote) agent 101 additionally provides a reward value for that timestamp.

The simulation environment 103 uses the tuple of sensor data to generate, per timestamp, a next image and a reward for that timestamp. Examples of components of a reward include, negative or zero values for undesirable behavior (such as for a crash, moving in the opposite direction, etc.) and positive values for desirable behavior (such as a non-zero value for on track and moving, a non-zero value for close to an assumed best course (such as center), and a non-zero value for a correct orientation). Note that a reward may comprise multiple components that have been summed.

In some embodiments, a ML model training data tuple per timestamp of an image, generated next image, reward, and action data is stored in storage 105 to be accessed by a ML training environment 107 which is used to train a ML algorithm 111. In some embodiments, a ML model training data tuple per timestamp of an image, generated next image, reward, and action data is more directly provided to the ML training environment 107 which is used to train the ML algorithm 111. The ML algorithm 111 is a reinforcement learning algorithm.

After the ML algorithm 111 has been trained using the ML model training environment 107, in some embodiments, the resulting ML model is deployed to one or more ML model using devices 109. For example, it is deployed to a robot, etc. In other embodiments, the resulting ML model is transmitted for deployment to an device command entity 113(A) or 113(B) that communicates commands to the ML model using device 109 based on sensor data such as that detailed above. Note that vectors of the ML model typically attempt to maximize the reward. The device command entity is to receive image and action data and utilize the trained machine learning model to generate and send commands to the ML model using device.

In some embodiments, one or more the simulation environment 103, ML model training environment 107, and storage 105 are a part of a provider network 113 which provides users with the ability to utilize one or more of a variety of types of computing-related resources such as compute resources (e.g., executing virtual machine (VM) instances and/or containers, executing batch jobs, executing code without provisioning servers, training machine learning models, etc.), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 113 across one or more intermediate networks (e.g., the internal via one or more interface(s), such as through use of application programming interface (API) calls, via a console implemented as a website or application, etc. The interface(s) may be part of, or serve as a front-end to, a control plane of the provider network 113 that includes "backend" services supporting and enabling the services that may be more directly offered to customers.

To provide these and other computing resource services, provider networks 113 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

Figure 2:
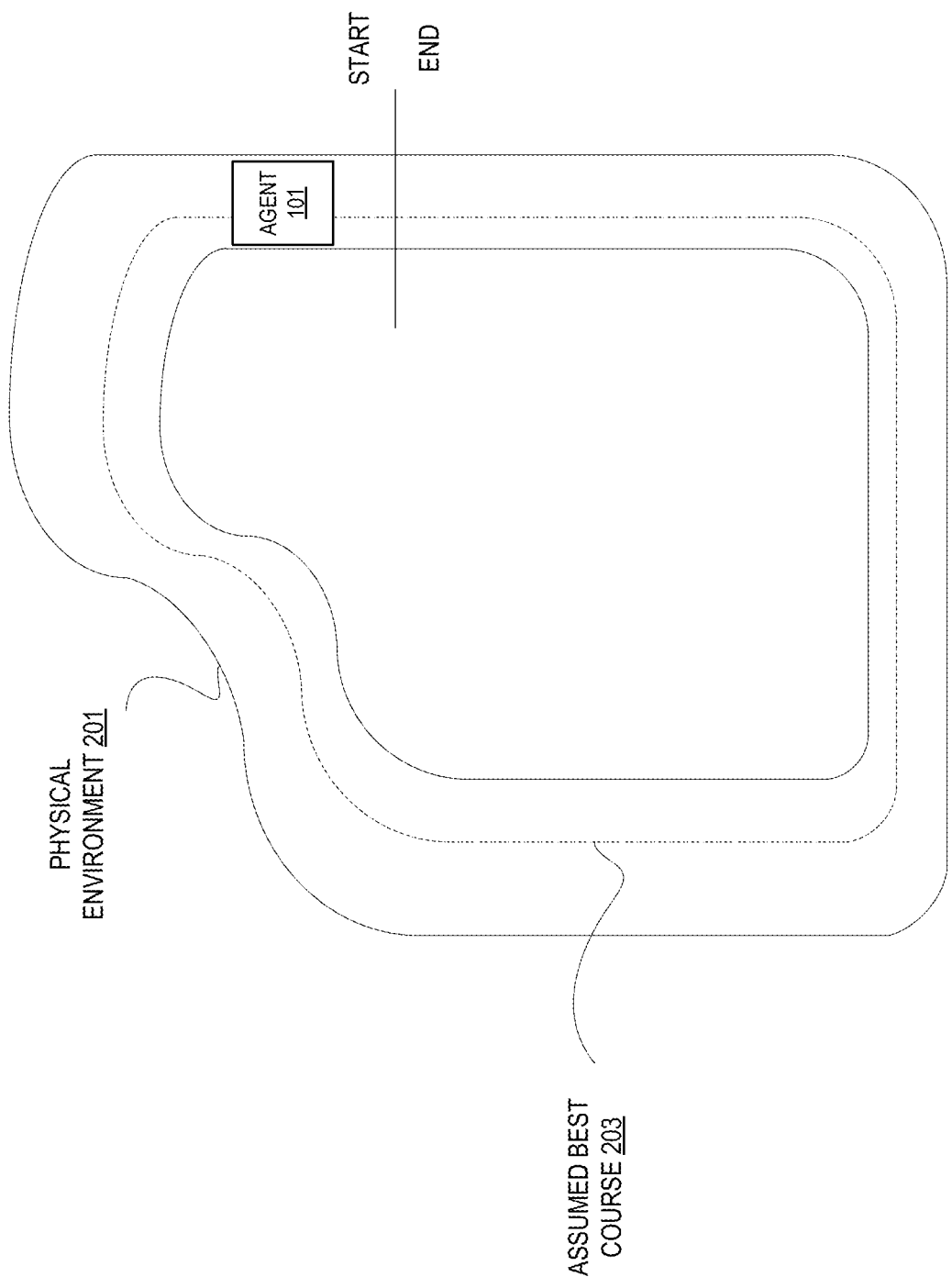

FIG. 2 illustrates an example of physical environment for a (remote) agent and subsequent ML model using device to interact with. In this example, a (remote) agent 101 is shown leaving a starting point to traverse its way around the physical environment 201 to an end point. An assumed best course 203 is shown with dashed lines. Typically, the (remote) agent 101 should stay close to that assumed best course 203 and would be rewarded for that behavior. The (remote) agent 101 typically receives its commands corresponding to actions to take from a remote source.

Figure 3:
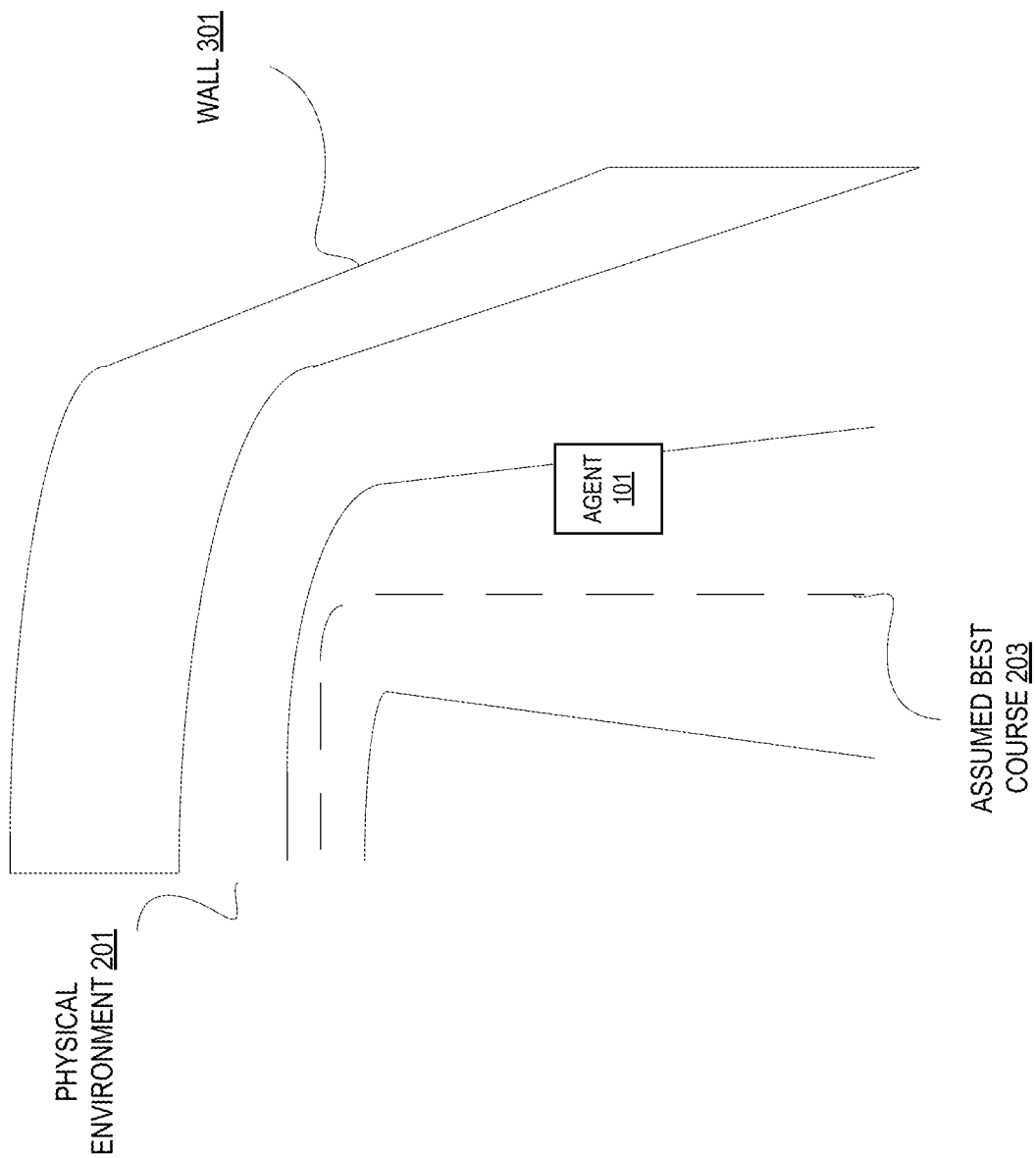

FIG. 3 illustrates another view of the exemplary of physical environment for a (remote) agent and subsequent ML model using device to interact with. In this example, a (remote) agent 101 is shown deviating from the assumed best course 203 and would be rewarded less for that behavior. Note that a physical environment may include obstacles such as the illustrated curved wall 301.

Figure 4:
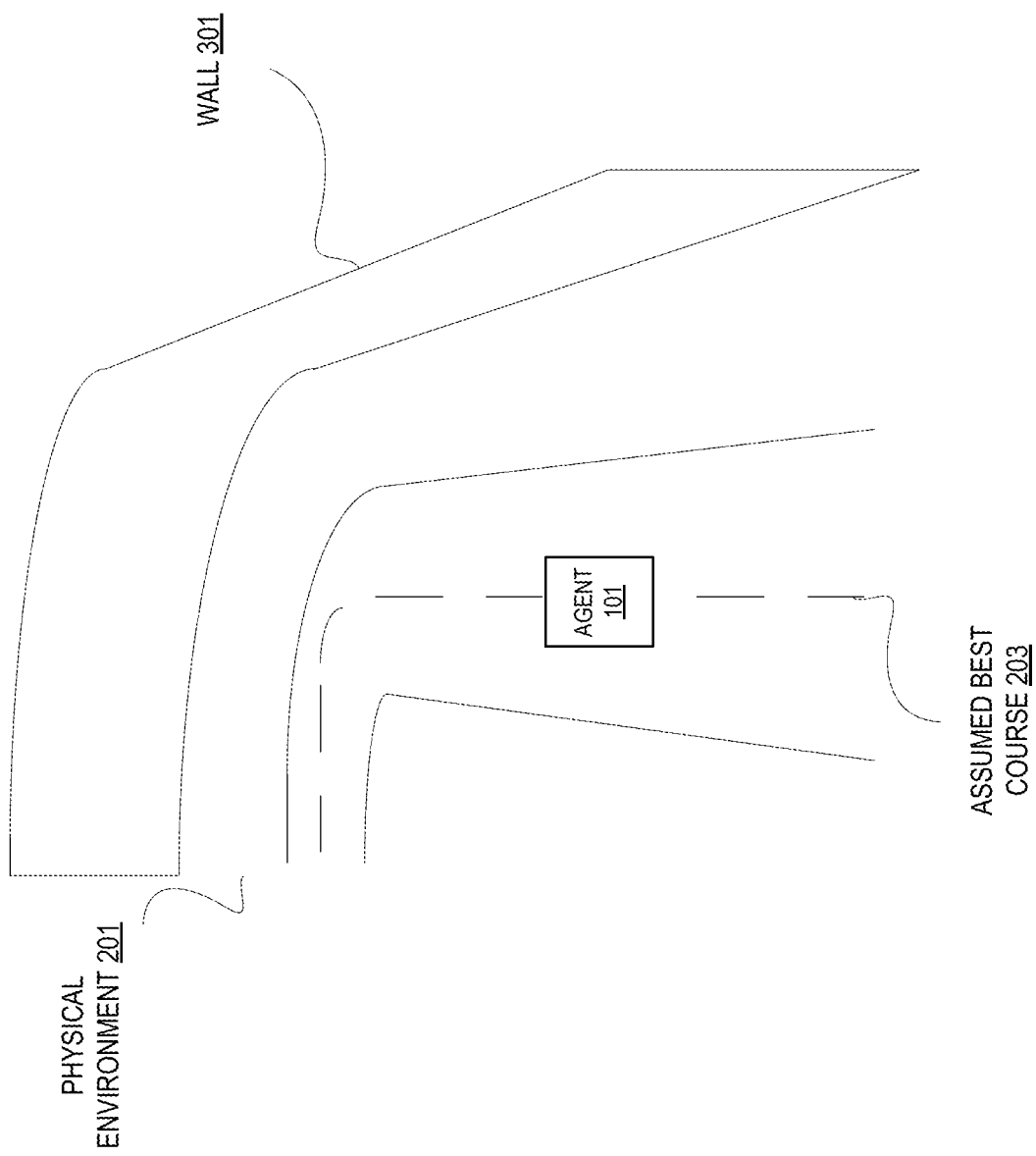

FIG. 4 illustrates another view of the exemplary of physical environment for a (remote) agent and subsequent ML model using device to interact with. In this example, a (remote) agent 101 is shown following from the assumed best course 203 and would be rewarded for that behavior. Again, note that a physical environment may include obstacles such as the illustrated curved wall 301.

Figure 5:
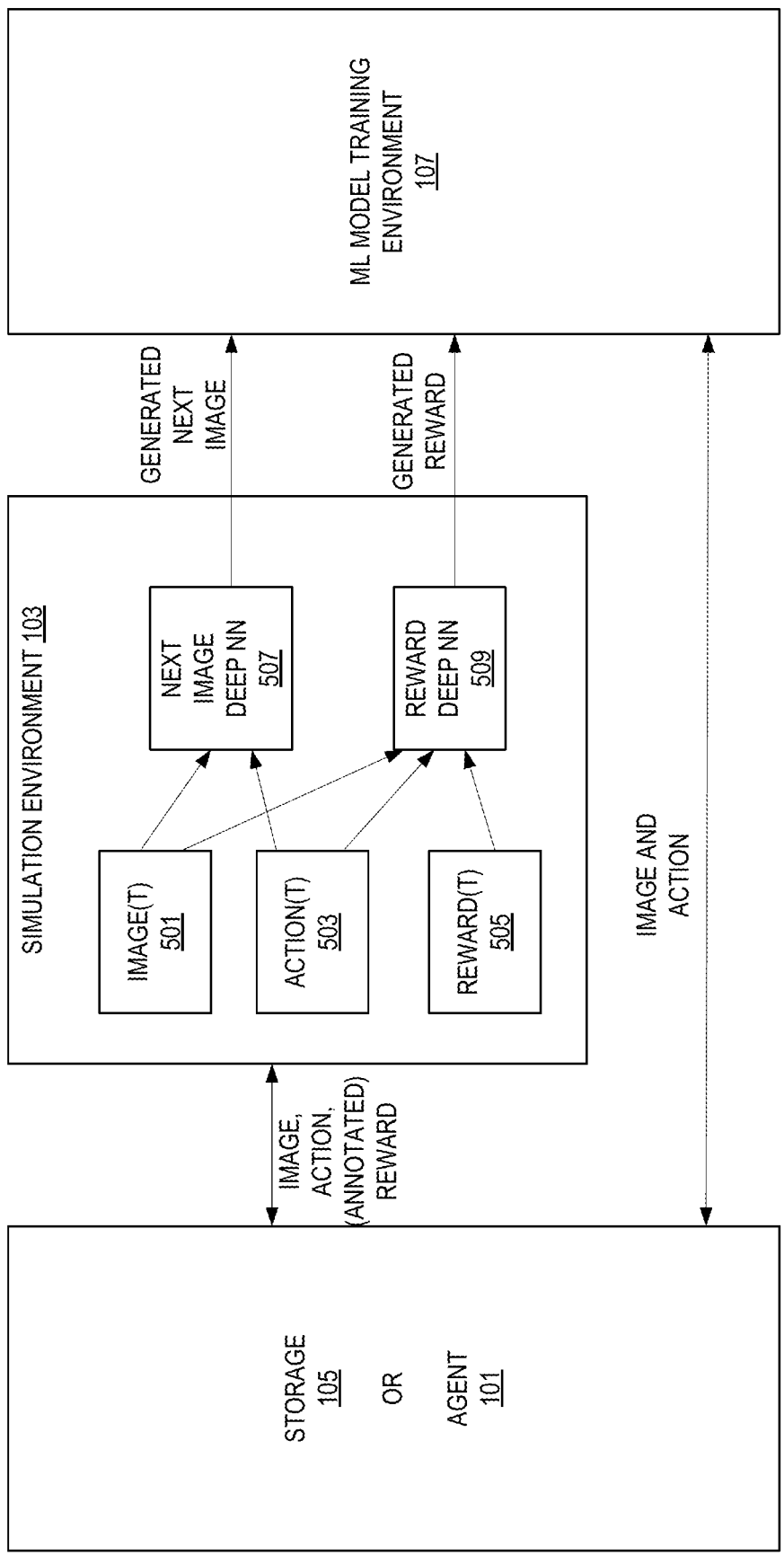
FIG. 5 illustrates an embodiment of a simulation environment and its interactions.

FIG. 5 illustrates an embodiment of a simulation environment and its interactions. As shown, the simulation environment 103 receives timestamped associated image and action data that was generated by a (remote) agent 101 interacting with a physical environment. This data may come from storage 105 and/or from the agent 101 itself. In some embodiments, a reward calculated by the (remote) agent 101 is also sent.

The simulation environment 103 uses at least the image data 501 and action data 1B03 for a timestamp to generate a next image (the image that should appear in the next time stamp) using a next image deep neural network 507 and determine reward using a reward deep neural network 509. In some embodiments, a reward 505 for the timestamp is used in the determination of the reward. In some embodiments, the next image deep neural network 507 is Canadian Institute for Advanced Research (CIFAR) image based or is a ResNet model.

The tuple of the determined reward, generated next image, and the original image and action data are used by the ML model training environment 107 to train a ML algorithm.

Figure 6:
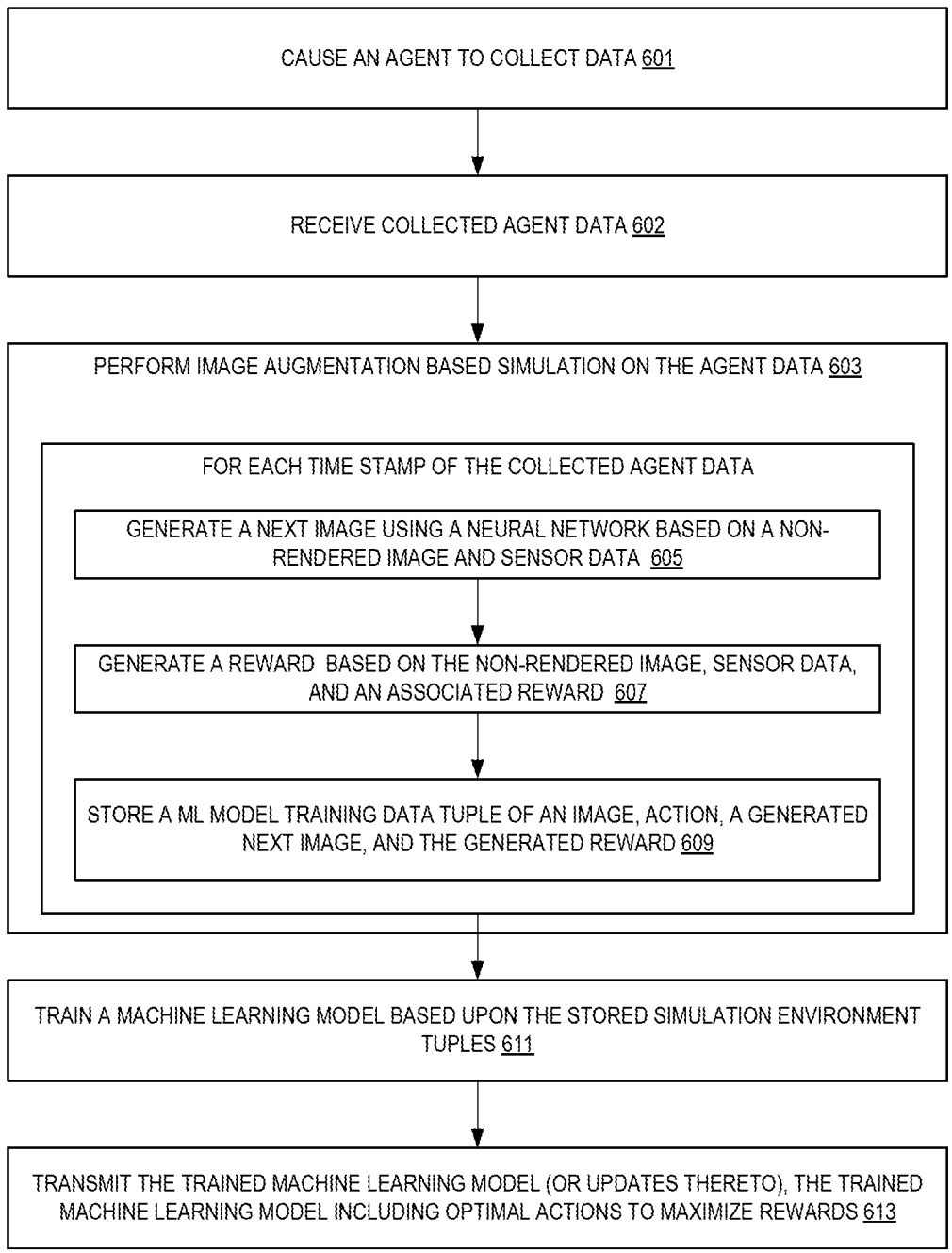
FIG. 6 illustrates embodiments of a method utilizing image-augmentation based simulation.

FIG. 6 illustrates embodiments of a method utilizing image-augmentation based simulation. In some embodiments, aspects of this method are performed by at least one or more of simulation environment and a ML model training environment.

At 601, a (remote) agent is caused to collect data. For example, a plurality of tuples of timestamped image, speed, and orientation data from a remotely controlled vehicle are collected in response to one or more commands.

This collected tuples of data are received at 602. These may be received in storage, such as storage 105, or by a simulation environment 103. In some embodiments, the collected tuples of data are annotated to include a reward. This typically occurs when the (remote) agent does not utilize previously trained ML model for movement.

Image-augmentation based simulations on the collected timestamped image, speed, and orientation data at 603. In some embodiments, this includes, for each tuple of timestamped image, speed, and orientation data from the remote agent, generating a next image using an image generation neural network based on the timestamped image, speed, and orientation data, the image being input into the image generation neural network as a non-rendered image at 605, generating a reward using a reward generating neural network based on the timestamped image, speed, and orientation data at 607, and storing the generated next image and generated reward along with the timestamped image, speed, and orientation data as a machine learning model training data tuple at 609. Note the image-augmentation based simulations may be performed as individual collected tuples of data are received or as a batch.

At 611, a machine learning model is trained using stored machine learning model training data tuples.

The trained machine learning model is transmitted at 613. As noted above, the trained machine learning model includes optimal acts to maximize rewards. In some embodiments, the trained machine learning model is transmitted for deployment on an ML model using device such as an autonomous (or partially autonomous) device. In other embodiments, the trained machine learning model is transmitted for deployment on a device command entity that communicates with a ML model using device, the trained machine learning model to be used to direct that ML model using device. The device command entity may be a part of a provider network, or external thereto. The device command entity is to receive image and action data and utilize the trained machine learning model to generate and send commands to the ML model using device.

Figure 7:
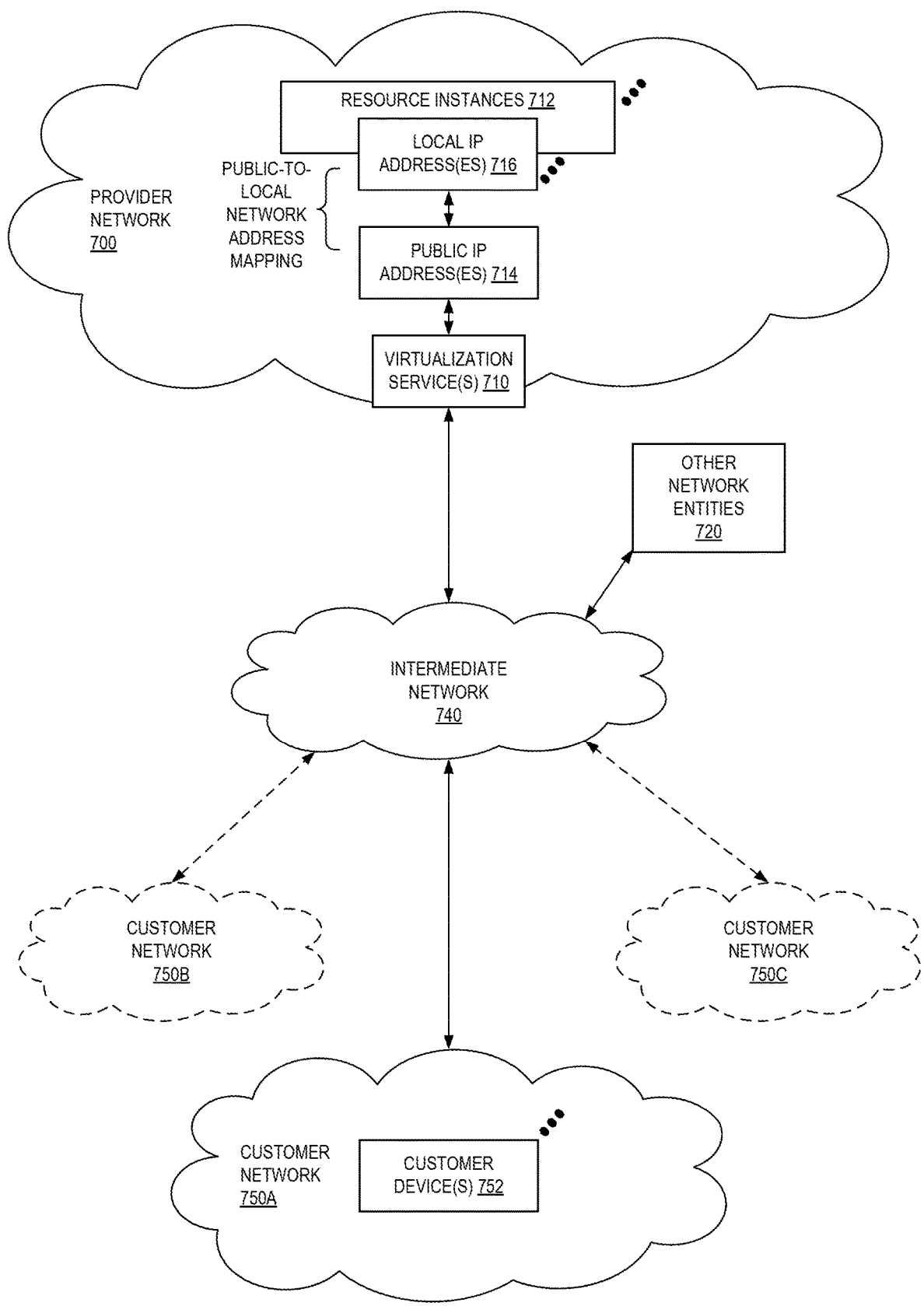
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
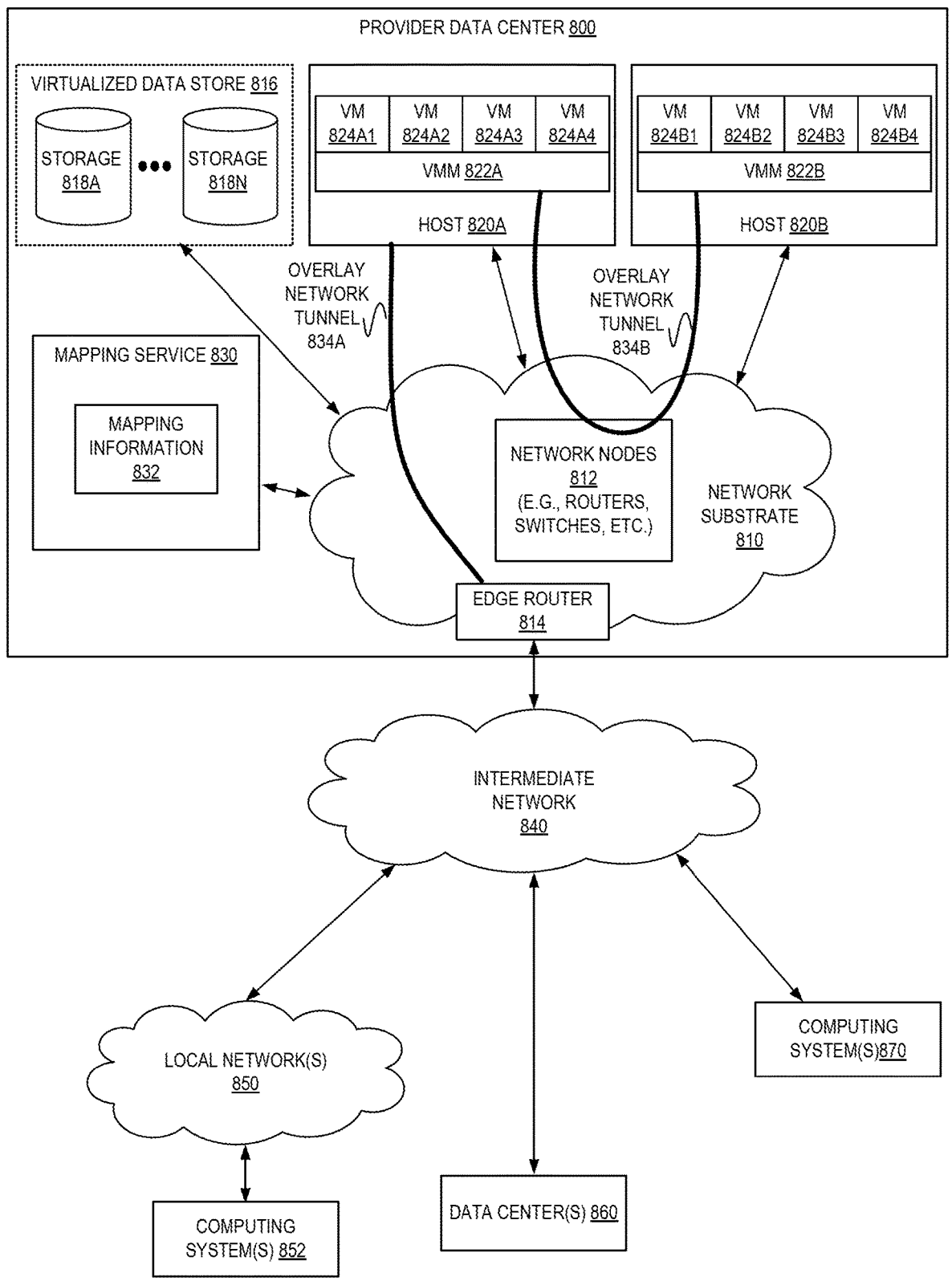
FIG. 8 illustrates an example data center that implements an overlay network on a network substrate using IP tunneling technology according to some embodiments.

FIG. 8 illustrates an example data center that implements an overlay network on a network substrate using IP tunneling technology, according to some embodiments. A provider data center 800 may include a network substrate that includes networking nodes 812 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 810 using tunnels. The IP tunneling technology may provide a mapping and encapsulating system for creating an overlay network on a network (e.g., a local network in data center 800 of FIG. 8) and may provide a separate namespace for the overlay layer (the public IP addresses) and the network substrate 810 layer (the local IP addresses). Packets in the overlay layer may be checked against a mapping directory (e.g., provided by mapping service 830) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 830) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 8, an example overlay network tunnel 834A from a virtual machine (VM) 824A (of VMs 824A1-824A4, via VMM 822A) on host 820A to a device on the intermediate network 850 and an example overlay network tunnel 834B between a VM 824A (of VMs 824A1-824A4, via VMM 822A) on host 820A and a VM 824B (of VMs 824B1-824B4, via VMM 822B) on host 820B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 8, at least some networks in which embodiments may be implemented may include hardware virtualization technology that enables multiple operating systems to run concurrently on a host computer (e.g., hosts 820A and 820B of FIG. 8), i.e. as virtual machines (VMs) 824 on the hosts 820. The VMs 824 may, for example, be executed in slots on the hosts 820 that are rented or leased to customers of a network provider. A hypervisor, or virtual machine monitor (VMM) 822, on a host 820 presents the VMs 824 on the host with a virtual platform and monitors the execution of the VMs 824. Each VM 824 may be provided with one or more local IP addresses; the VMM 822 on a host 820 may be aware of the local IP addresses of the VMs 824 on the host. A mapping service 830 may be aware of (e.g., via stored mapping information 832) network IP prefixes and IP addresses of routers or other devices serving IP addresses on the local network. This includes the IP addresses of the VMMs 822 serving multiple VMs 824. The mapping service 830 may be centralized, for example on a server system, or alternatively may be distributed among two or more server systems or other devices on the network. A network may, for example, use the mapping service technology and IP tunneling technology to, for example, route data packets between VMs 824 on different hosts 820 within the data center 800 network; note that an interior gateway protocol (IGP) may be used to exchange routing information within such a local network.

In addition, a network such as the provider data center 800 network (which is sometimes referred to as an autonomous system (AS)) may use the mapping service technology, IP tunneling technology, and routing service technology to route packets from the VMs 824 to Internet destinations, and from Internet sources to the VMs 824. Note that an external gateway protocol (EGP) or border gateway protocol (BGP) is typically used for Internet routing between sources and destinations on the Internet. FIG. 8 shows an example provider data center 800 implementing a network that provides resource virtualization technology and that provides full Internet access via edge router(s) 814 that connect to Internet transit providers, according to some embodiments. The provider data center 800 may, for example, provide customers the ability to implement virtual computing systems (VMs 824) via a hardware virtualization service and the ability to implement virtualized data stores 816 on storage resources 818A-818N via a storage service.

The data center 800 network may implement IP tunneling technology, mapping service technology, and a routing service technology to route traffic to and from virtualized resources, for example to route packets from the VMs 824 on hosts 820 in data center 800 to Internet destinations, and from Internet sources to the VMs 824. Internet sources and destinations may, for example, include computing systems 870 connected to the intermediate network 840 and computing systems 852 connected to local networks 850 that connect to the intermediate network 840 (e.g., via edge router(s) 814 that connect the network 850 to Internet transit providers). The provider data center 800 network may also route packets between resources in data center 800, for example from a VM 824 on a host 820 in data center 800 to other VMs 824 on the same host or on other hosts 820 in data center 800.

A service provider that provides data center 800 may also provide additional data center(s) 860 that include hardware virtualization technology similar to data center 800 and that may also be connected to intermediate network 840. Packets may be forwarded from data center 800 to other data centers 860, for example from a VM 824 on a host 820 in data center 800 to another VM on another host in another, similar data center 860, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 818A-818N, as virtualized resources to customers of a network provider in a similar manner.

Figure 9:
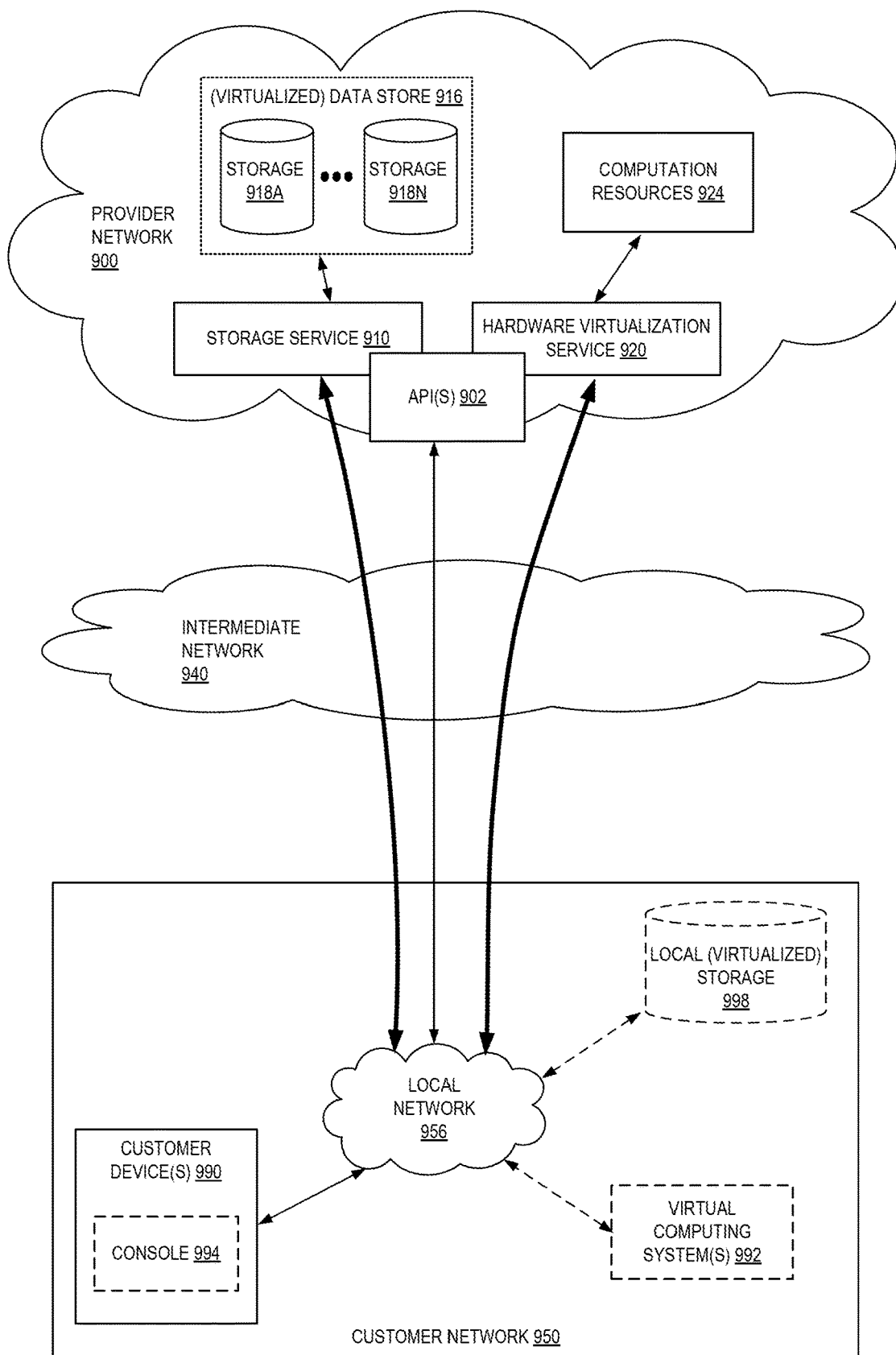
FIG. 9 is a block diagram of an example provider network that provides a storage service and a hardware virtualization service to customers, according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
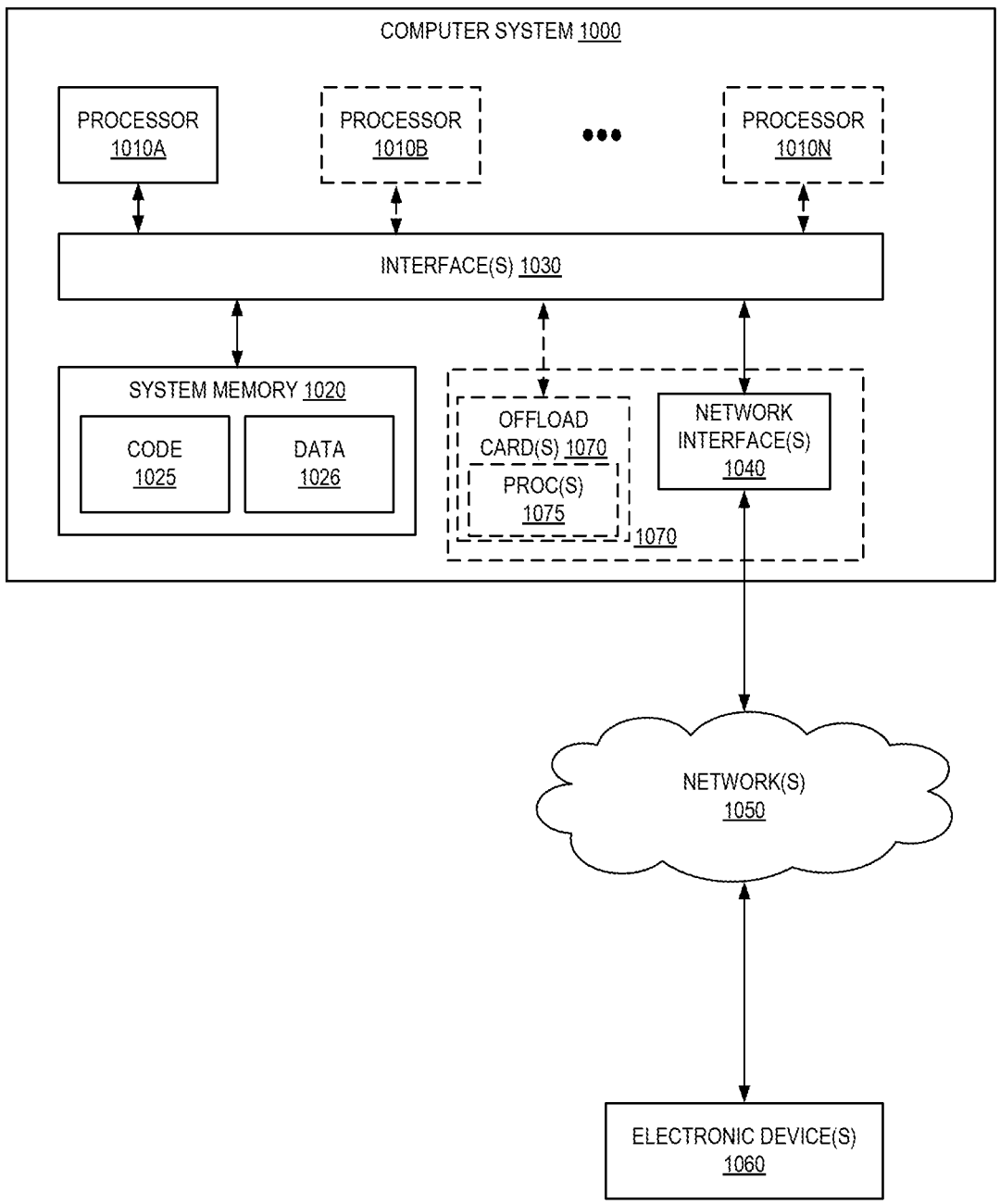
FIG. 10 is a block diagram illustrating an example computer system that may be used in some embodiments.

In some embodiments, a system that implements a portion or all of the techniques as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
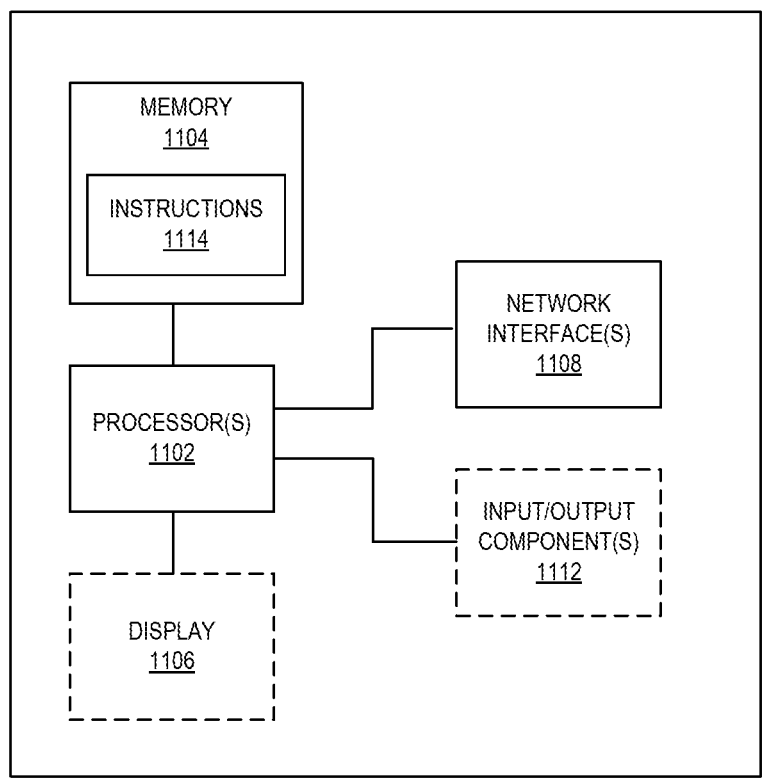
FIG. 11 illustrates a logical arrangement of a set of general components of an exemplary computing device that can be utilized in accordance with various embodiments.

FIG. 11 illustrates a logical arrangement of a set of general components of an example computing device 1100 such as the simulation environment 103, ML model training environment 107[BL1], etc. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (e.g., instructions 1114) and/or data, and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1114) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 12:
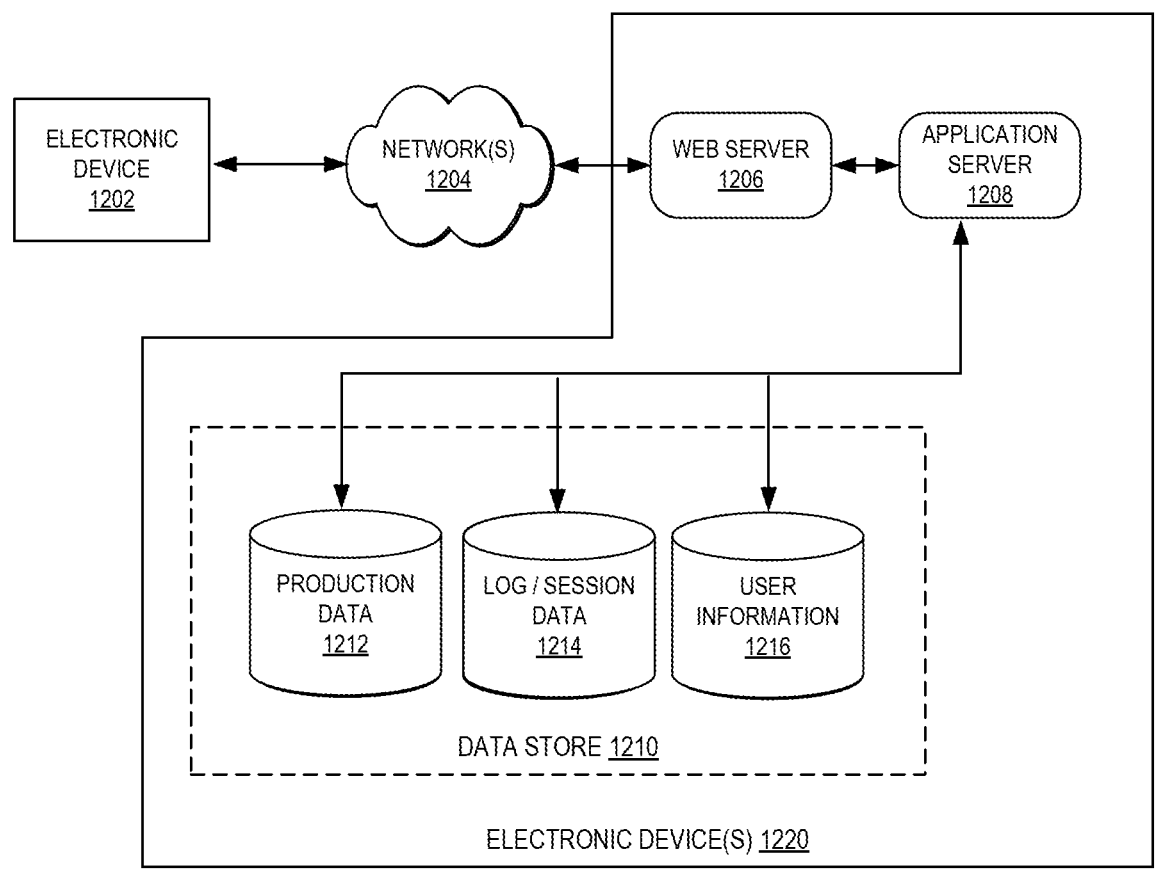
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments requests are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various embodiments. The system includes an electronic client device 1202, which may also be referred to as a client device and can be any appropriate device operable to send and receive requests, messages or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving the plurality of tuples of timestamped image, speed, and orientation data from a remotely controlled vehicle;
    performing image-augmentation based simulations on the received tuples of image, speed, and orientation data by, for each tuple of timestamped image, speed, and orientation data from the remotely controlled vehicle,
        generating a next image using an image generation neural network based on the timestamped image, speed, and orientation data, the image being input into the image generation neural network as a non-rendered image,
        generating a reward using a reward generating neural network based on the timestamped image, speed, and orientation data, and
        storing the generated next image and generated reward along with the timestamped image, speed, and orientation data as a machine learning model training data tuple;

training a machine learning model using stored machine learning model training data tuples; and deploying the trained machine learning model on another device that is different from the remotely controlled vehicle, the trained machine learning model to at least partially control movement of the another device.

2. The computer-implemented method of claim 1, wherein the trained machine learning model is a reinforcement machine learning model.

3. The computer-implemented method of claim 1, wherein image generation neural network is one of a CIFAR-based or ResNet network.

4. A computer-implemented method comprising:

receiving the plurality of tuples of timestamped image and movement data;

performing image-augmentation based simulations on the received tuples of image and movement data by, for each tuple of timestamped image and movement data, generating a next image using an image generation neural network based on the timestamped image and movement data, the image being input into the image generation neural network as a non-rendered image, generating a reward using a reward generating neural network based on the timestamped image and movement data, and training a machine learning model using machine learning model training data tuples comprising, per timestamp, image and movement data, a generated next image, and a generated reward; and transmitting the trained machine learning model.

5. The computer-implemented method of claim 4, further comprising:

storing the generated next image and generated reward along with the timestamped image and movement data as a machine learning model training data tuple.

6. The computer-implemented method of claim 4, wherein the tuples of timestamped image and movement data are received from a first device and the trained machine learning model is transmitted to on a second device.

7. The computer-implemented method of claim 6, wherein the movement data comprises speed and orientation data.

8. The computer-implemented method of claim 6, wherein the reward comprises a sum of one or more components associated with a behavior of the second device.

9. The computer-implemented method of claim 4, wherein the performing image-augmentation based simulations on the received tuples of image and movement data is performed using a provider network service.

10. The computer-implemented method of claim 4, wherein the trained machine learning model is transmitted to device command entity which is to provide commands to a device based on image and movement data provided by the device.

11. The computer-implemented method of claim 4, wherein the trained machine learning model is to maximize a reward for a given image and movement.

12. The computer-implemented method of claim 4, wherein the trained machine learning model is a reinforcement machine learning model.

13. The computer-implemented method of claim 4, wherein image generation neural network is one of a CIFAR-based or ResNet network.

14. A system comprising:

a web service implemented by a second one or more electronic devices, the web service including instructions that upon execution cause the web service to:

receive the plurality of tuples of timestamped image and movement data;

perform image-augmentation based simulations on the received tuples of image and movement data by, for each tuple of timestamped image and movement data, generating a next image using an image generation neural network based on the timestamped image and movement data, the image being input into the image generation neural network as a non-rendered image, generating a reward using a reward generating neural network based on the timestamped image and movement data, and train a machine learning model using machine learning model training data tuples comprising, per timestamp, image and movement data, a generated next image, and a generated reward; and transmit the trained machine learning model.

15. The system of claim 14, further comprising instructions to cause:

storing the generated next image and generated reward along with the timestamped image and movement data as a machine learning model training data tuple.

16. The system of claim 15, wherein the tuples of timestamped image and movement data are received from a first device and the trained machine learning model is transmitted to on a second device.

17. The system of claim 16, wherein the movement data comprises speed and orientation data.

18. The system of claim 15, wherein the reward comprises a sum of one or more components associated with a behavior of the second device.

19. The system of claim 15, wherein the trained machine learning model is transmitted to device command entity which is to provide commands to a device based on image and movement data provided by the device.

20. The system of claim 15, wherein the trained machine learning model is to maximize a reward for a given image and movement.

* * * * *